United States Patent [19]
Grayson et al.

[11] Patent Number: 5,082,557
[45] Date of Patent: Jan. 21, 1992

[54] CONTROL HEAD FOR WATER PURIFIER

[75] Inventors: John R. Grayson, Inverness; David Pettinato, Schaumburg, both of Ill.

[73] Assignee: RainSoft Water Conditioning Co., Elk Grove Village, Ill.

[21] Appl. No.: 503,154

[22] Filed: Apr. 2, 1990

[51] Int. Cl.⁵ .............................................. B01D 61/12
[52] U.S. Cl. ................................... 210/109; 137/270; 137/513.7; 210/110; 210/116; 210/134; 210/135; 210/257.1; 210/257.2; 210/418
[58] Field of Search .............. 210/110, 116, 117, 130, 210/133, 134, 135, 136, 257.1, 257.2, 424, 109, 248, 418; 137/493, 513.7, 270

[56] References Cited

U.S. PATENT DOCUMENTS

| | | | |
|---|---|---|---|
| 844,438 | 2/1907 | Bayley | 210/424 |
| 1,778,280 | 10/1930 | Shetler | 210/138 |
| 2,545,425 | 3/1951 | Fischer | 210/138 |
| 3,380,590 | 4/1968 | Grayson | 210/134 |
| 3,719,593 | 3/1973 | Astil | 210/136 |
| 3,849,305 | 11/1974 | Manjikian | 210/116 |
| 4,009,572 | 3/1977 | Cooper | 137/493 |
| 4,032,451 | 6/1977 | Rosaen | 210/130 |
| 4,482,456 | 11/1984 | Grayson | 210/134 |
| 4,695,375 | 9/1987 | Tyler | 210/110 |
| 4,853,117 | 8/1989 | Burrows | 210/110 |
| 4,895,654 | 1/1990 | Burrows | 210/135 |

Primary Examiner—Robert A. Dawson
Assistant Examiner—Joseph Drodge
Attorney, Agent, or Firm—Emrich & Dithmar

[57] ABSTRACT

A water purifier includes a canister containing a reverse osmosis filter unit and threadedly engaged with a control head which is adapted to be coupled to a source of tap water, to a purified water storage tank, to a faucet or other remote usage location and to a waste water drain. The head includes a normally-open inlet valve controlling the flow of tap water to the filter unit and a drain valve controlling flow of waste water to the drain. The inlet valve closes in response to back pressure in the storage tank when it is filled to shut off the apparatus. A normally-closed and normally-disabled bypass valve can be selectively enabled for opening in response to a predetermined lower back pressure in the storage tank when it is less than completely full for diverting purified water from the filter unit to the drain. The drain valve is continuously adjustable between fully open and fully closed conditions. The drain valve has inlet and outlet ports which can be selectively reversed to eliminate deposits built up at the inlet port. The drain valve can also be selectively moved to a fast-flush condition for blocking the normal drain channel therethrough and opening an alternative fast flush channel.

20 Claims, 3 Drawing Sheets

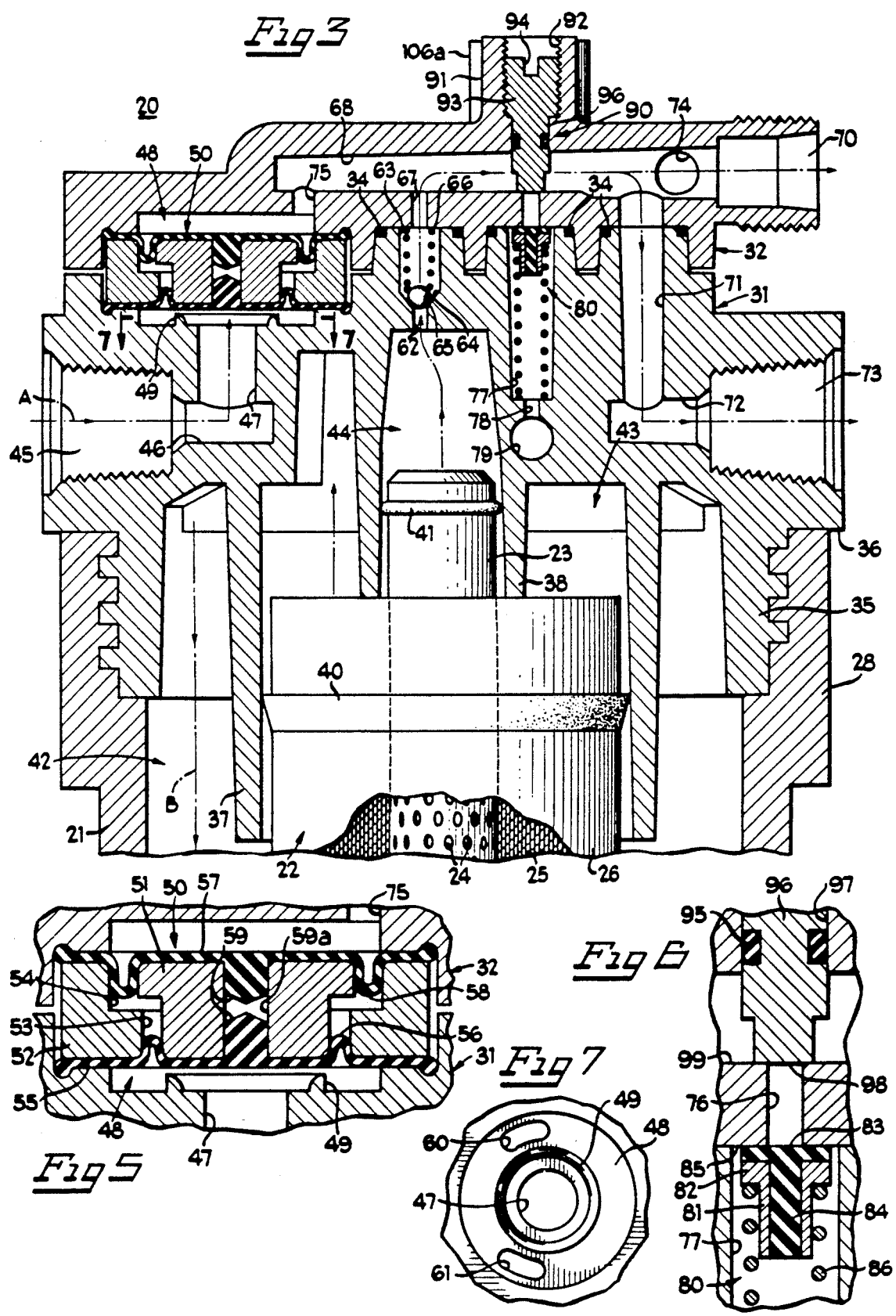

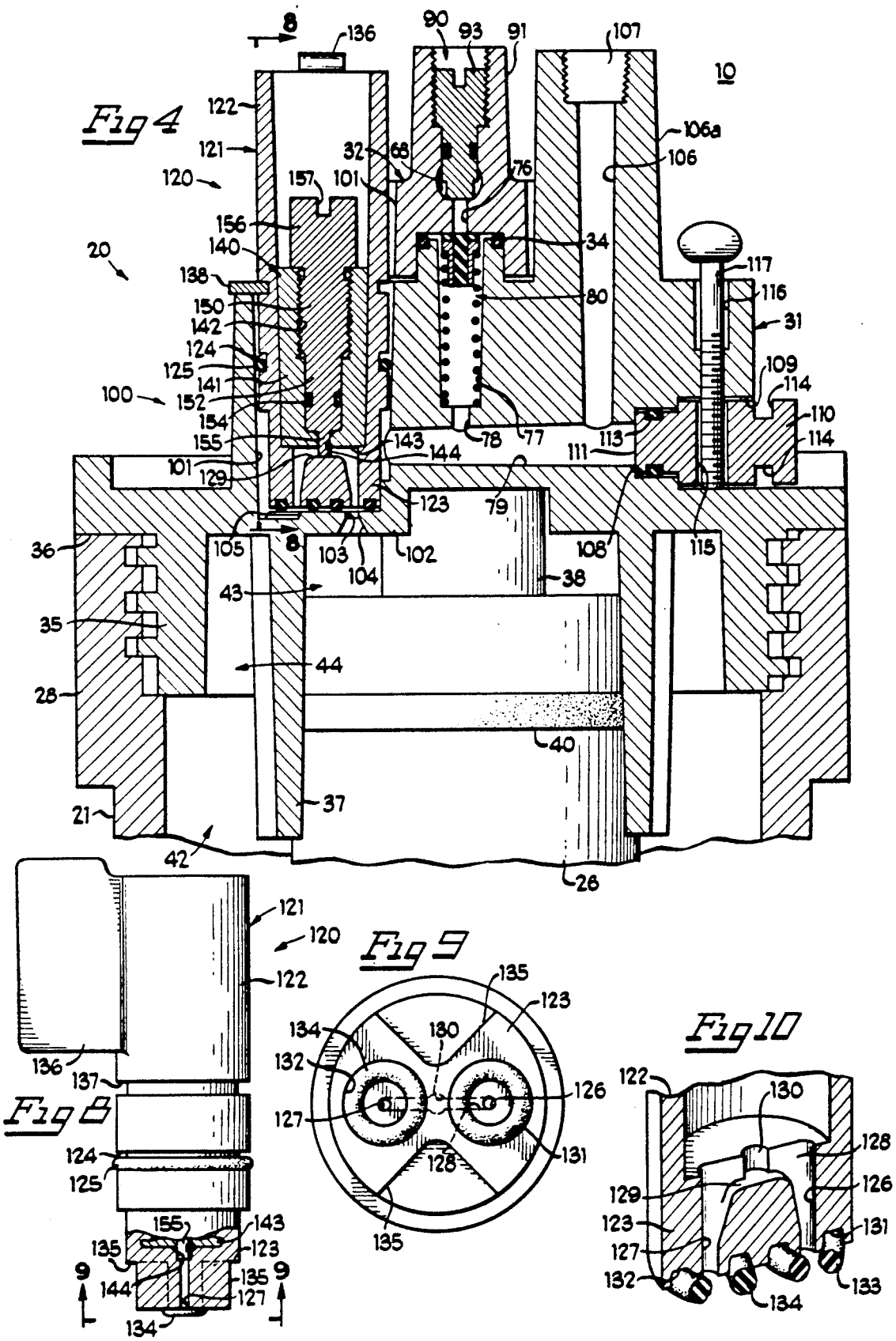

CONTROL HEAD FOR WATER PURIFIER

BACKGROUND OF THE INVENTION

1. Field of the Invention

The present invention relates to purified water supply systems of the type having a reverse osmosis unit for producing purified water from an incoming supply of ordinary tap water or the like. The invention has particular application to water purifying systems of the type which do not require any electrical power.

2. Description of the Prior Art

Water purification by means of a reverse osmosis membrane has become well recognized in the art. Prior art water purifying systems have typically included a reverse osmosis unit which has an inlet coupled to a source of ordinary tap water or the like, and a purified water outlet coupled to a purified water storage tank and/or to a faucet or other remote usage location, and to a waste water drain. The reverse osmosis unit typically includes flow passages and valve means for controlling the flow of water through the system. In operation, tap water flows into the reverse osmosis unit and that portion which flows through the membrane is purified and passes to the storage tank and/or faucet, while waste water which does not pass through the membrane exits to the drain. A pre-filter unit may be used upstream of the reverse osmosis unit for removing particulates, and a post-filter unit, such as an activated charcoal filter, may be utilized between the reverse osmosis unit and the remote faucet or other usage location.

Prior art systems occasionally provide a shut-off valve which automatically closes the tap water inlet when the storage tank is filled with purified water, thereby to avoid wastage of tap water. However, it has been found that when the shutoff valve remains closed for an extended period of time, bacterial growth can occur in the system. Since such bacterial growth can be eliminated by continuous water flow, some prior art systems eliminate the shutoff valve to allow tap water to flow continuously through the system, thereby continuously washing the reverse osmosis membrane. However, in the typical system several gallons of tap water may flow to the drain for every gallon of purified water produced and, therefore, a continuous flow system results in substantial water wastage.

It is also known to provide a fixed flow to the drain, but prior art systems have not permitted variation of the rate of flow to the drain. Furthermore, contaminants in the drain water may build up on the inlet side of the drain and can eventually clog the drain.

SUMMARY OF THE INVENTION

It is a general object of the present invention to provide an improved water purifying system which avoids the disadvantages of prior systems while affording additional structural and operating advantages.

An important feature of the invention is the provision of a water purifying system of the reverse osmosis type which effectively prevents buildup of deposits on the drain valve.

In connection with the foregoing feature, it is another feature of the invention to provide a water purifying system of the type set forth, which includes a selectively reversible drain valve.

In connection with the foregoing feature, still another feature of the invention is the provision of a water purifying system of the type set forth, wherein the drain valve includes a fast forward flushing position to break up and help remove any scaling that might build up.

Yet another feature of the invention is the provision of a water purifying system of the type set forth, which permits adjustment of the rate of flow through the drain valve.

It is another feature of the invention to provide a water purifying system of the type set forth which permits user selection between automatic shut-off and continuous flow modes of operation.

Still another feature of the invention is the provision of a water purifying system of the type set forth which is of relatively simple and economical construction.

These and other features of the invention are attained by providing in a water purifying apparatus including a purifying unit and means defining flow paths among the purifying unit, a source of tap water, a purified water outlet and a waste water drain, the improvement comprising: valve means in one of the flow paths, the valve means including means defining first and second ports and a flow channel therebetween, means for controlling the flow of water through the flow channel, and mode control means for shifting said valve means between first and second modes, the first and second ports respectively serving as inlet and outlet ports both communicating with the one flow path when the valve means is disposed in its first mode, the first and second ports respectively serving as outlet and inlet ports both communicating with the one flow path when the valve means is disposed in its second mode.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a fragmentary view in vertical section taken along the line 3—3 in FIG. 2;

FIG. 4 is a fragmentary view in vertical section taken along the line 4—4 in FIG. 2;

FIG. 5 is a further enlarged, fragmentary view in vertical section of the inlet valve assembly of FIG. 3;

FIG. 6 is a further enlarged, fragmentary view in vertical section of the bypass valve assembly of FIG. 3;

FIG. 7 is a fragmentary view in horizontal section taken along the line 7—7 in FIG. 3;

FIG. 8 is a side elevational view of the drain valve assembly taken generally along the line 8—8 in FIG. 4, and with portions broken away more clearly to illustrate the construction;

FIG. 9 is a still further enlarged bottom plan view of the drain valve assembly of FIG. 8, taken generally along the line 9—9 therein and rotated 90° to the position illustrated in FIG. 4; and FIG. 10 is a further enlarged perspective view in vertical section of the lower end of the drain valve of FIG. 4, with portions thereof removed for clarity of illustration.

DESCRIPTION OF THE PREFERRED EMBODIMENT

Figure 1:
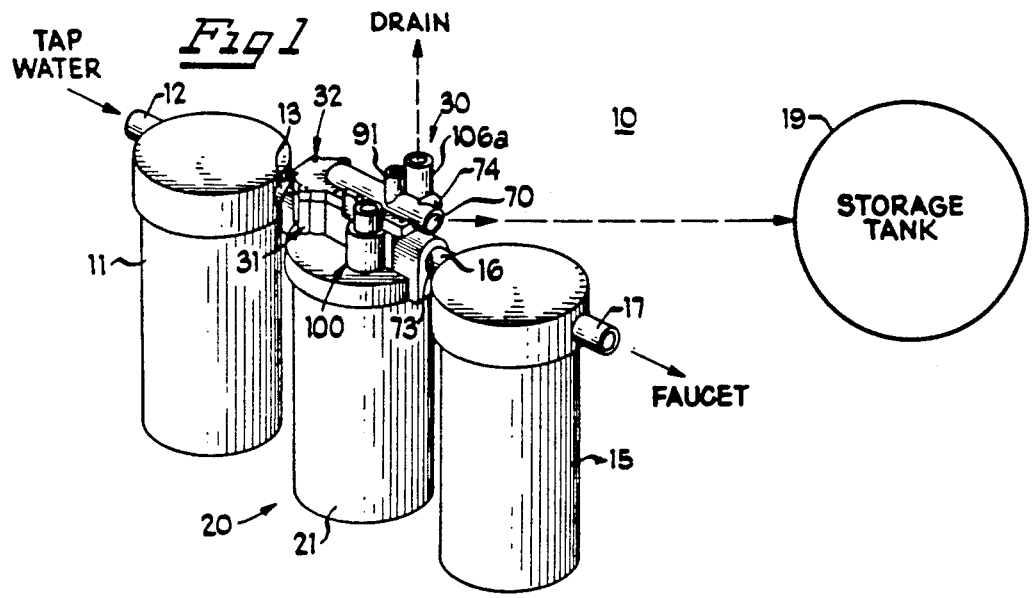
FIG. 1 is a partially perspective and partially diagrammatic view of a water purifying system including a reverse osmosis unit constructed in accordance with and embodying the features of the present invention.

Referring to FIG. 1, there is illustrated a water purifying system 10 which includes a pre-filter module 11 having an inlet 12 adapted to be coupled to an associated source of ordinary tap water, and an outlet 13. The pre-filter module 11 typically includes a filter for removing relatively large particulate matter and sediment (over 20 microns in size) from the tap water. If desired, there could also be provided a charcoal pre-filter for removing chlorine from the water supply. The system 10 also includes a post-filter module 15 having an inlet 16 and an outlet 17 adapted to be coupled to an associated faucet or other remote appliance for utilizing purified water. The post-filter module 15 typically includes a charcoal filter for removing unwanted tastes, odors and other impurities from the water. The system 10 also includes a storage tank 19 for storing purified water for future use.

The water purifying system 10 also includes a reverse osmosis module 20 which has an inlet coupled to the outlet 13 of the pre-filter module 11, and purified water outlets coupled, respectively, to the inlet 16 of the post-filter module 15, to the storage tank 19 and to auxiliary usage devices. Referring also to FIG. 3, the reverse osmosis module 20 includes a canister 21 in which is disposed a reverse osmosis filter unit 22 comprising a central tube 23 which is closed at its lower end (not shown) and open at its upper end and is provided intermediate its ends with a plurality of perforations 24 around the circumference thereof. Wrapped around the central tube 23 are multiple plies of a semi-permeable membrane 25 defining a cylindrical bundle which is encased within a water-impermeable cylindrical coating or sheath 26 open at the upper and lower ends thereof. The canister 21 has an internally threaded upper end 28 adapted to be coupled to an associated control head 30.

Figure 2:
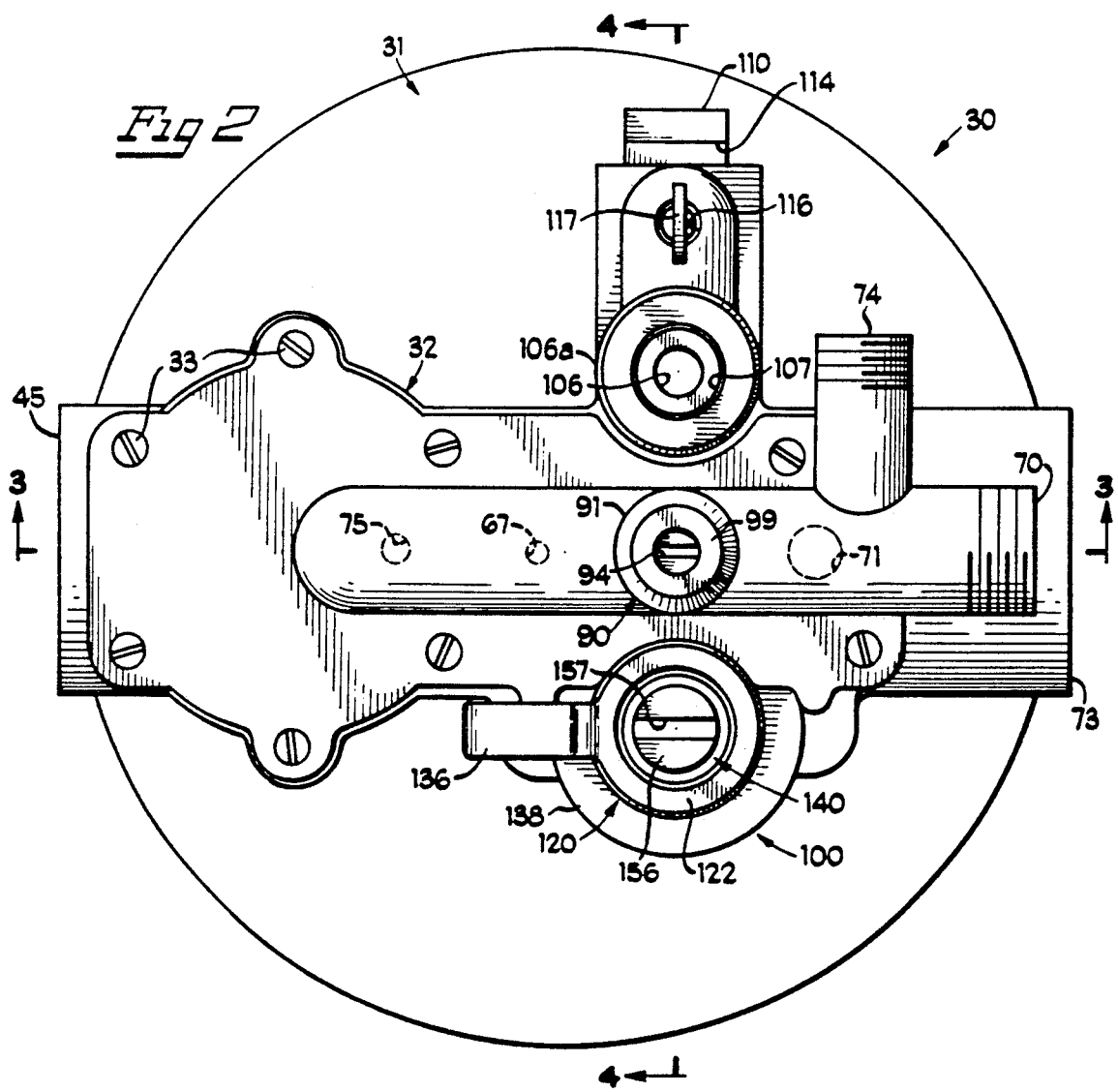
FIG. 2 is an enlarged, top plan view of the reverse osmosis unit of the system of FIG. 1.

Referring now also to FIGS. 2 and 4 of the drawings, the control head 30 is constructed in accordance with and embodies the features of the present invention, and includes a lower body 31 and an upper body 32 secured together by a plurality of suitable fasteners 33 (FIG. 2). The lower and upper bodies 31 and 32 cooperate to define a plurality of passages and cavities in the control head 30, some of which extend between the lower and upper bodies 31 and 32 and are encircled by suitable sealing O-rings 34 (FIG. 3) trapped between the bodies 31 and 32. Integral with the lower body 31 is an externally threaded cylindrical collar 35 which depends from an annular shoulder 36, the collar 35 being threadedly engaged with the upper end 28 of the canister 21 until the latter bears against the shoulder 36 for closing the canister 21. Projecting downwardly from the lower body 31 coaxially with the collar 35 and spaced radially inwardly therefrom is an outer cylindrical projection 37 which depends below the lower end of the collar 35. An inner cylindrical projection 38 projects from the lower body 31 coaxially with the outer cylindrical projection 37 and spaced radially inwardly therefrom, the inner projection 38 terminating short of the lower end of the collar 35.

In use, the upper end of the reverse osmosis filter unit 22 is received snugly within the outer cylindrical projection 37, with the upper end of the central tube 23 extending upwardly into the inner cylindrical projection 38, until the lower end of the projection 38 bears against the upper end of the semi-permeable membrane 25. The filter unit 22 is sealed against the outer cylindrical projection 37 by a brine seal 40, and the central tube 23 is sealed against the inner projection 38 by an O-ring seal 41. It can be seen that the outer cylindrical projection 37 cooperates with the collar 35 to define an outer annular space 42 and cooperates with the inner cylindrical projection 38 to define an inner annular space 43 above the membrane 25 of the filter unit 22. The inner cylindrical projection 38 is so dimensioned as to define a chamber 44 above the upper end of the central tube 23 of the reverse osmosis filter unit 22 when it is mounted in place. The reverse osmosis filter unit 22 is so dimensioned that, when it is mounted in the control head 30, as illustrated in FIGS. 3 and 4, its lower end will be spaced above the lower end of the canister 21.

Referring now in particular to FIGS. 3 and 5, there is formed in the lower body 31 an inlet port 45 which is adapted to be threadedly coupled for connection to the outlet 13 of the pre-filter module 11 for receiving pre-filtered tap water therefrom. A passage 46 provides communication between the inlet port 45 and a vertical passage 47 which opens into the center of a cylindrical valve chamber 48 which spans the lower and upper bodies 31 and 32. An annular upstanding valve seat ridge 49 encircles the outlet end of the passage 47.

Disposed in the chamber 48 is an inlet valve assembly 50, which is preferably of the pressure-responsive diaphragm type. Referring to FIG. 5, the inlet valve assembly 50 includes an annular center plug 51 encircled by an annular spacer 52, which parts cooperate to define therebetween annular lower and upper gaps 53 and 54. A lower diaphragm 55 spans the underside of the center plug 51 and annular spacer 52, and has an annular rib 56 disposed in the lower gap 53, the outer periphery of the diaphragm 55 being trapped between the annular spacer 52 and the lower body 31 of the control head 30. Similarly, an upper diaphragm 57 spans the upper side of the center plug 51 and the annular spacer 52, and has an annular rib 58 which is disposed in the upper gap 54, the outer periphery of the upper diaphragm 57 being trapped between the annular spacer 52 and upper body 32 of the control head 30. Each of the upper and lower diaphragms 57 and 55 has a central hub 59 received in a central bore 59a through the center plug 51.

In its normal, rest position, illustrated in FIG. 3, the lower diaphragm 55 of the inlet valve assembly 50 is spaced from the valve seat ridge 49 to permit water to flow from the passage 47 radially outwardly over the valve seat ridge 49 and into that portion of the chamber 48 which is disposed beneath the inlet valve assembly 50 and around the outside of the valve seat ridge 49. Formed in the lower body 31 are two channels 60 and 61 (FIG. 7), the upper ends of which communicate with the valve chamber 48 radially outwardly of the valve seat ridge 49, and the lower ends of which (not shown) communicate with the annular space 42. Thus, it will be appreciated that inlet water flows through the inlet port 45 and the passages 46 and 47 over the valve seat ridge 49 and into the valve chamber 48, and thence via the channels 60 and 61 into the canister 21 along the outside of the reverse osmosis filter unit 20, as indicated by the arrows A and B in FIG. 3.

The central tube 23 of the reverse osmosis filter unit 22 communicates with the chamber 44 which, in turn, communicates through a port 62 with a valve chamber 63 having a frustoconical lower end defining a seat surface 64 for a check valve ball 65, which is resiliently urged against the seat surface 64 by a helical compression spring 66 for normally closing the port 62. The upper end of the valve chamber 63 communicates via a port 67 in the upper body 32 with an elongated, horizontal, purified water passage 68 which opens at an outlet nozzle 70 adapted to be threadedly coupled to suitable tubing for connection to the storage tank 19. The passage 68 in turn communicates with a vertical passage 71 which extends downwardly from the upper body 32 to the lower body 31 and there communicates with a horizontal passage 72 which opens into an outlet port 73 which is adapted to be threadedly coupled to the inlet 16 of the post-filter module 15. The passage 68 also communicates with an auxiliary outlet port 74 (FIGS. 2 and 3), which may be threadedly coupled to a suitable test monitoring device (not shown). The other end of the passage 68 communicates by a port 75 with the inlet valve chamber 48 above the inlet valve assembly 50.

The passage 68 also communicates via a port 76 (FIG. 4) with a bypass valve chamber 77 formed in the lower body 31, the lower end of which chamber communicates via a port 78 with an elongated horizontal drain passage 79. Referring also to FIG. 6, there is disposed in the chamber 77 a bypass valve assembly 80, which includes a tubular holder 81 provided at its upper end with a radially outwardly extending annular flange 82. Overlying the flange 82 is a resilient seal disk 83 provided with a stem 84 received in the tubular holder 81. The seal disk 83 is urged into sealing relationship with a seat surface 85 on the upper body 32 by a helical compression spring 86, one end of which bears against the flange 82 of the holder 81, and the other end of which is seated at the lower end of the valve chamber 77. The seal disk has a diameter greater than that of the lower end of the port 76 and is aligned substantially coaxially therewith, so that the bypass valve assembly normally closes the lower end of the port 76.

The bypass valve assembly 80 is selectively enabled by a control assembly 90. More particularly, the upper body 32 has an upstanding tubular turret 91 having an internally threaded bore 92 therethrough which communicates with the passage 68. Threadedly engaged in the bore 92 is a stem 93 provided with a screwdriver slot 94 at its upper end. The stem 93 has a reduced lower end 96 which projects through a reduced bore 96 into the passage 68, and is encircled by an O-ring seal 95 (FIG. 6). The end 96 is provided with a circular end surface 98 having a diameter greater than that of the port 76 and aligned coaxially therewith for engagement with a seat surface 99 to close the upper end of the port 76. It will be appreciated that when the stem 93 is screwed upwardly, the upper end of the port 76 is opened, exposing the bypass valve assembly 80 and thereby enabling it, as will be explained in greater detail below.

Referring now to FIGS. 4, and 8-10, there is provided in the control head 30 a drain assembly 100. More specifically, there is formed through the upper body 32 and into the upper surface of the lower body 31 a cylindrical cavity 101 (FIG. 4) closed at its lower end by a base wall 102. The cavity 101 communicates via a port 103, having an outwardly-flared lower end 104, with the upper end of the annular space 43 between the inner and outer cylindrical projections 38 and 37 and above the membrane 25 of the reverse osmosis filter unit 22. Formed in the lower end of the cavity 101 is a short radial channel 105. The cavity 101 communicates with one end of the drain passage 79, the other end of which communicates with a vertical drain passage 106 which extends upwardly through a turret 106a on the lower body 31 to a drain outlet 107 which is adapted to be threadedly coupled to suitable tubing for connection to a drain.

The drain passage 79 has an enlarged open end 108 provided with a further enlarged outer portion 109 which is substantially square in transverse cross section. The open end 108 is closed by a drain plug 110 which has a substantially square body which matingly engages in the square portion 109 of the drain passage 79 and a reduced cylindrical end 111 which is received in the open end 108 of the drain passage 79, with a seal therebetween being provided by a O-ring 113. Slots 114 are provided on opposite sides of the drain plug 110 at the outer end thereof for facilitating removal thereof with an associated tool, such as a screwdriver. The drain plug 110 has a vertical bore 115 extending therethrough which is aligned in use with a vertical passage 116 through the adjacent portion of the lower body 31, a suitable pin, such as a screw 117, being received through the aligned passage 116 and bore 115 for retaining the drain plug 110 in place.

The drain assembly 100 further includes a drain valve assembly 120, which includes an elongated, generally tubular barrel 121 having a generally cylindrical side wall 122 closed at one end by a relatively thick end wall 123. The side wall 122 is provided with an annular groove 124 in its outer surface in which is received an O-ring seal 125 to provide a water-tight seal between the barrel 121 and the wall of the cavity 101. Formed in the bottom surface of the end wall 123 are two spaced-apart, substantially parallel ports 126 and 127 (FIGS. 9 and 10), which respectively communicate at their upper ends with opposite ends of a horizontally extending flow channel 128. The lower side of the channel 128 defines a seat surface 129, while the upper portion thereof opens through the upper surface of the end wall 123. Extending vertically through the flow channel 128 intermediate its ends is a cylindrical bore 130 which has a diameter greater than the width of the flow channel 128 (see FIG. 10). Formed in the bottom surface of the end wall 123, respectively in surrounding relationship with the ports 126 and 127, are two annular grooves 131 and 132, in which are respectively seated O-rings 133 and 134 which are disposed, in use, in sealing relationship with the base wall 102 at the bottom of the cavity 101. Formed in the sides of the end wall 123 at diametrically opposed locations aligned substantially perpendicular to the axis of the drain channel 128 are two enlarged, generally V-shaped grooves or notches 135 (FIGS. 8 and 9), which have their apices disposed radially inwardly and spaced from the flow channel 128. The notches 135 extend vertically from the bottom surface of the end wall 123 to approximately the level of the seat surface 129.

Integral with the barrel 121 at its upper end and extending radially outwardly therefrom is an enlarged, flat, mode-control handle 136. Disposed in the outer surface of the barrel side wall 122 is an annular groove 137 (FIG. 8) in which is disposed, in use, a generally semi-circular retaining clip 138 (FIG. 4) which is received in a channel between the lower and upper bodies 31 and 32 for retaining the drain valve assembly 120 in the cavity 101.

Telescopically received in the barrel 121 is a generally tubular insert 140 having a substantially cylindrical side wall 141 provided at its upper end with an internally-threaded portion 142 and closed at its lower end by a circular end wall 143 having a cylindrical bore 144 extending centrally therethrough. In use, the insert 140 is fixedly secured to the upper surface of the end wall 123 of the barrel 121, as by ultrasonic welding, the bore 144 having a diameter substantially the same as that of the bore 130 in the end wall 123 and being aligned in use coaxially therewith. Threadedly engaged in the insert 140 is a control stem 150 having a reduced lower end 152 which is provided with an O-ring 154 for providing a water-tight seal between the control stem 150 and the side wall 141 of the insert 140. Integral with the reduced end 152 at its lower end and projecting axially therefrom is a further reduced cylindrical blocking pin 155, which extends in use through the aligned bores 144 and 130. The control stem 150 is provided at its upper end with an enlarged head 156 having a screwdriver slot 157 at its outer end.

The operation of the water purifying system 10 will now be explained in detail. Normally, the drain valve assembly 120 will be disposed in the normal drain mode illustrated in FIG. 4, and the control assembly 90 will be disposed in the automatic shutoff condition illustrated in FIGS. 3, 4 and 6, closing the upper end of the port 76 and thereby disabling the bypass valve assembly 80. The storage tank 19 is assumed to be substantially empty and the inlet valve assembly 50 is in its normally-open condition, illustrated in FIGS. 3 and 5.

Tap water passes through the pre-filter module 11 and the pre-filtered water then passes through the outlet conduit 13 and into the inlet port 45 of the reverse osmosis module 20. The water flows through the passages 46 and 47, and then flows radially outwardly over the valve seat ridge 49 and into the lower portion of the valve chamber 48 beneath the inlet valve assembly 50. From there the water flows downwardly through the channels 60 and 61 (FIG. 7) into the annular space 42 which opens into the upper end of the canister 21 around the outside of the reverse osmosis filter unit 22.

The water then flows to the bottom of the canister 21 and beneath the reverse osmosis filter unit 22, and thence upwardly through the plies of the filter membrane 25, inside the sheath 26 and around the outside of the central tube 23, as the water level rises in the canister 21. The water moves radially inwardly through the plies of the filter membrane 25 and thence through the perforations 24 into the interior of the central tube 23. The purified water then exits the upper end of the central tube 23 into the chamber 44, and thence through the port 62, past the check valve 65, through the port 67 and into the purified water passage 68, from whence it flows around the reduced end 96 of the control stem 93 toward the outlets.

At this point, the water will follow the path of least resistance. If the purified water faucet or other remote usage device is open, the water will flow downwardly through the passage 71, and thence through the passage 72 and the outlet port 73 and the inlet 16 to the post filter module 15, the post-filtered water then flowing through the outlet 17 to the associated faucet, or other remote usage device. If the faucet and any auxiliary usage devices are closed, the water will flow through the outlet port 70 to the storage tank 19.

As the water level rises in the storage tank 19, the back pressure thereof will increase. Since the system 10 is in its automatic shutoff condition, when the storage tank 19 is substantially filled, the back pressure therein will reach a level sufficient to displace the center plug 51 of the inlet valve assembly 50 downwardly relative to the annular spacer 52, thereby driving the lower diaphragm 55 into sealing engagement with the valve seat ridge 49 (see FIG. 5) for closing the inlet valve assembly 50 and shutting off the flow of tap water from the pre-filter module 11. If one of the usage devices is now opened, purified water may flow briefly from the outlet of the reverse osmosis filter unit 22 until the pressure therein is relieved, and purified water will then flow from the storage tank 19 back to the purified water passage 68 and thence through the outlet port 73. When the back pressure in the storage tank 19 has dropped sufficiently with lowering of the water level therein, the inlet valve assembly 50 will reopen.

As indicated above, if the system 10 is subjected to long periods of non-use, the presence of stagnant water in the reverse osmosis module 20 may result in the growth of unwanted bacteria. Since this condition can be prevented by maintaining continuous water flow through the reverse osmosis module 20, the system 10 can also be selectively operated in a continuous-flow condition, instead of the automatic shutoff condition, just described. For conversion to the continuous flow condition, the user backs the stem 93 upwardly in the turret 91 a slight distance, using a screwdriver, thereby to unseat the end surface 98 from the seat surface 99 to open the upper end of the port 76. If desired, a suitable retainer (not shown) may be disposed in the upper end of the bore 92 to prevent retraction of the stem 93 to a point where the O-ring 95 would move out of sealing engagement with the reduced bore 96.

When the upper end of the port 76 is opened, the bypass valve assembly 80 is enabled by being exposed to the back pressure in the storage tank 19. When that back pressure reaches a predetermined value, slightly less than that required to close the inlet valve assembly 50, the bias of the spring 86 will be overcome and the seal disk 83 will be moved downwardly out of engagement with the seat surface 85, thereby opening the bypass valve assembly 80 and permitting purified water to flow from the passage 68 through the bypass cavity 77 and the port 78 into the drain passage 79. Referring to FIG. 4., the water will then flow from the drain passage 79 upwardly through the drain passage 106 and the outlet port 107 to an associated drain. Thus, the purified water will bypass the storage tank 19, preventing it from completely filling and thereby preventing shutoff of the inlet valve assembly 50.

It will be appreciated that not all of the water which passes through the reverse osmosis filter unit 22 will flow into the central tube 23. That which does not, exits from the top of the membrane 25 into the annular space 43 (see FIG. 4), from which it passes through the drain valve assembly 120 into the drain passage 79. It is a significant aspect of the present invention, that the drain valve assembly 120 is operable in normal drain and fast flush modes, and is continuously adjustable in the normal drain mode for varying the flow rate therethrough. In FIG. 4, the drain valve assembly 120 is illustrated in a first or forward normal drain mode, in which the mode control handle 136 is directed toward the pre-filter module 11. In this arrangement, the flow channel 128 is disposed substantially parallel to the axis of the drain passage 79, and the port 126 is aligned with the port 103 in the base wall 102 for receiving water from the annular space 43.

The water flows from the port 126 through the flow passage 128 and out the port 127, through the channel 105 in the base wall 102 and thence into the lower portion of the cavity 101 around the outside of the end wall 123 of the barrel 121 and into the drain passage 79. The rate of flow through the drain valve assembly 120 in this normal drain mode is regulated by rotation of the control stem 150, thereby moving it axially for varying the extension of the blocking pin 155 into the flow channel 128. It will be appreciated that the control stem 150 is operable between a fully closed position, illustrated in FIGS. 4 and 8, wherein the blocking pin 155 is seated against the seat surface 129 for completely closing the flow channel 128, and a fully open position (not shown), wherein the blocking pin 155 is completely withdrawn from the flow channel 128. However, since flow through the drain valve assembly 120 in its normal drain mode is limited by the small diameter of the ports 126 and 127, the flow rate will always be relatively small, even when the control stem 150 is adjusted for maximum flow. In this regard, it will be appreciated that the O-rings 133 and 134 prevent drain water from bypassing the ports 126 and 127 when the drain valve assembly 120 is in its normal drain mode.

In use, deposits of foreign materials may tend to build up at the inlet of the port 126 and, because of the small diameter of this port, such deposits may eventually clog the port, preventing effective draining. In this event, the present invention affords a means for unclogging the port without removing the drain valve assembly 120. More specifically, the user simply grasps the mode control handle 136 and rotates the drain valve assembly 120 through 180° until the handle 136 points toward the post-filter module 15. In this position, the drain valve assembly 120 will be in a reverse normal drain mode, wherein the port 127 is aligned with the port 103 as the inlet port, and the port 126 is aligned with the channel 105 as the outlet port. Normal drainage flow in this position will tend to wash away any deposits which have built up on the port 126.

Occasionally, it may be desirable to wash the reverse osmosis filter unit 22 by flushing water rapidly through the membrane 25. For this purpose, the drain valve assembly 120 may be operated in a fast-flush mode by operating the mode control handle 136 to rotate the drain valve assembly 120 90° from the position illustrated in FIG. 4 to that illustrated in FIG. 8. It will be appreciated that, in this position, one of the V-shaped notches 135 will be aligned with the port 103. The notch 135 opens directly into the annular space in the cavity 101 surrounding the end wall 123 of the barrel 121, and its large width permits a rapid drain flow from the annular space 43 into the drain passage 79.

In the disclosed embodiment, the ports 45, 73 and 107 have been illustrated as internally threaded, while the ports 70 and 74 have been illustrated as externally threaded nozzles. However, it will be appreciated that this is simply for convenience and, if desired, any of these ports may be either internally or externally threaded, as desired. Furthermore, while specific types of valve constructions have been illustrated for the valve assemblies 50, 65, 80 and 120, it will be appreciated that other types of valve constructions could be utilized to achieve the same functions. In a constructional model of the present invention, the lower and upper bodies 31 and 32, the control stem 93, the drain plug 110, the barrel 121, the insert 140 and the control stem 150 are all preferably formed of a suitable plastic material, such as polypropylene.

From the foregoing, it can be seen that there has been provided an improved water purifying system and, in particular, an improved control head for a reverse osmosis module, which is of relatively simple and economical construction, permits selection between automatic shutoff and continuous flow conditions of operation and which provides a drain valve assembly which is selectively operable between normal drain and fast-flush modes, being continuously adjustable for varying the flow rate in the normal drain mode.

We claim:

1. In a water purifying apparatus including a purifying unit and means defining flow paths selectively fluidly connecting the purifying unit, a source of tap water, a purified water outlet and a waste water drain, the improvement comprising: valve means in one of the flow paths, said valve means including means defining first and second ports and a flow channel therebetween, means for controlling the flow of water through said flow channel, and mode control means for shifting said valve means between first and second modes by moving said ports relative to said one flow path such that said first and second ports respectively function as inlet and outlet ports for said flow channels when said valve means is disposed in its first mode and said first and second ports respectively function as outlet and inlet ports for said flow channel when said valve means is disposed in its second mode, both of said ports fluidly communicating with said one flow path in both of said modes.

2. The apparatus of claim 1, wherein said valve means is a drain valve and said one flow path is to the waste water drain.

3. The apparatus of claim 1, wherein said valve means is rotatably movable between its first and second modes.

4. The apparatus of claim 3, wherein said first and second ports are so disposed that said valve means is rotatable through an angle of substantially 180 degrees between its first and second modes.

5. The apparatus of claim 1, and further comprising means defining a fast flush channel, said mode control means being operable for shifting said valve means to a third mode in which said fast flush channel is disposed in communication with said one flow path and said first and second ports are disposed out of communication with said one flow path.

6. The apparatus of claim 5, wherein said mode control means includes means for rotatably moving said valve means among the first and second and third modes thereof.

7. The apparatus of claim 5, wherein said fast flush channel is formed in said valve means.

8. The apparatus of claim 1, wherein said means for controlling the flow of water through said flow channel is continuously adjustable between fully open and fully closed positions.

9. In a water purifying apparatus including a reverse osmosis unit, inlet means defining a flow path between the unit and a source of tap water, outlet means defining a flow path between the unit and a purified water outlet, drain means defining a drain flow path between the unit and a waste water outlet, and an inlet valve controlling the flow of tap water through the inlet means, the improvement comprising: a drain valve for controlling the flow of waste water through the drain flow path, said drain valve including means defining a flow channel adapted for communication with the drain flow path, and control means selectively movable among a fully closed position for preventing flow through said flow channel, a fully open position permitting substantially unrestricted flow through said flow channel and at least one intermediate position permitting restricted flow through said flow channel.

10. The apparatus of claim 9, wherein said control means is continuously adjustable between the fully closed and fully open positions for continuously varying the rate of flow through said flow channel.

11. The apparatus of claim 10, wherein said control means is manually operable.

12. The apparatus of claim 9, wherein said control means includes a blocking member spanning a width of said flow channel, said blocking member being movable transversely of said flow channel throughout the full depth thereof between the fully closed and fully open positions of said control means.

13. The apparatus of claim 12, wherein said blocking member comprises a cylindrical pin, said control means including a screw mechanism for effecting rotational and axial movement of said pin.

14. The apparatus of claim 9, wherein said drain valve includes means defining a flash flush channel, and mode control means for shifting said drain valve between normal and fast flush modes, said flow channel communicating with the drain flow path and said fast flush channel being out of communication with the drain flow path when said valve means is in its normal mode, said flash flush channel communicating with the drain flow path and said flow channel being out of communication with the drain flow path when said valve means is in its flash flush mode.

15. In a water purifying apparatus including a purifying unit, means defining flow paths among the unit and a source of tap water and a purified water storage tank and a waste water drain and accommodating flow of purified water from an outlet of the purifying unit to the storage tank, and a normally-open inlet valve disposed in a flow path from the source to the inlet of the purifying unit for controlling the flow of tap water from the source to the purifying unit and closable in response to the filling of the storage tank to a first predetermined volume to shut off the supply of tap water, the improvement comprising: means defining a bypass path between the outlet of the purifying unit and the waste water drain, normally-closed bypass valve means for controlling the flow of water through said bypass path, and means for opening said bypass valve means to cause purified water to flow through said bypass path to the waste water drain instead of to the storage tank, thereby to prevent filling of the storage tank to the first predetermined volume and consequent closure of the inlet valve.

16. The apparatus of claim 15, wherein said means for opening said bypass valve means includes means responsive to filling of the storage tank to a second predetermined volume less than the first predetermined volume.

17. The apparatus of claim 16, wherein the inlet valve and said bypass valve means are responsive to back pressure developed in the storage tank.

18. The apparatus of claim 17, wherein said bypass valve means is resiliently biased to its normally-closed condition.

19. The apparatus of claim 15, and further comprising: control means selectively operable between first and second conditions, said control means in the first condition thereof disabling said bypass valve means to prevent opening thereof, said control means in the second condition thereof enabling said bypass valve means to permit opening thereof.

20. The apparatus of claim 19, wherein said control means is manually operable from one to the other of said first and second conditions thereof.

* * * * *

UNITED STATES PATENT AND TRADEMARK OFFICE
CERTIFICATE OF CORRECTION

PATENT NO. : 5,082,557
DATED : January 21, 1992
INVENTOR(S) : John R. Grayson and David Pettinato It is certified that error appears in the above-identified patent and that said Letters Patent is hereby corrected as shown below:

Column 10, line 31, "channels" should be --channel--.

Column 11, line 30, "flash" should be --fast--;

line 36, "flash" should be --fast--;

line 39, "flash" should be --fast--.

Signed and Sealed this

Eighth Day of February, 1994

*Attest:*

BRUCE LEHMAN

*Attesting Officer*     *Commissioner of Patents and Trademarks*